United States Patent
Tryti et al.

(10) Patent No.: US 10,298,005 B2
(45) Date of Patent: May 21, 2019

(54) HIGH VOLTAGE PENETRATOR WITH ELECTRIC FIELD CONTROL

(71) Applicant: Vetco Gray Scandinavia AS, Sandvika (NO)

(72) Inventors: Svein Tryti, Sandvika (NO); Jan Erik Elnan-Knutsen, Sandvika (NO); Erik Raad, Billingstad (NO); Gorm Sande, Sandvika (NO)

(73) Assignee: Vetco Gray Scandinavia AS, Sandvika (NO)

( * ) Notice: Subject to any disclaimer, the term of this patent is extended or adjusted under 35 U.S.C. 154(b) by 0 days.

(21) Appl. No.: 15/507,766

(22) PCT Filed: Aug. 27, 2015

(86) PCT No.: PCT/EP2015/069684
§ 371 (c)(1),
(2) Date: Mar. 1, 2017

(87) PCT Pub. No.: WO2016/034499
PCT Pub. Date: Mar. 10, 2016

(65) Prior Publication Data
US 2017/0294770 A1 Oct. 12, 2017

(30) Foreign Application Priority Data
Sep. 1, 2014 (NO) .................................. 20141069

(51) Int. Cl.
*H01R 13/523* (2006.01)
*H01R 13/53* (2006.01)
(Continued)

(52) U.S. Cl.
CPC ............. *H02G 15/064* (2013.01); *H02G 3/22* (2013.01); *H02G 15/013* (2013.01)

(58) Field of Classification Search
CPC .... H02G 15/013; H02G 15/064; H02G 15/14; H02G 3/22; H02G 15/103; H01R 13/5219; H01R 13/523
See application file for complete search history.

(56) References Cited

U.S. PATENT DOCUMENTS 2,352,158 A 6/1944 Bishop
6,326,550 B1 12/2001 Dyer et al.
(Continued)

FOREIGN PATENT DOCUMENTS

EP 2 887 480 A1 6/2015
GB 501285 A 2/1939
(Continued)

OTHER PUBLICATIONS

First Office Action and Search issued in connection with corresponding No. Application No. 20141069 dated Jan. 22, 2015.
(Continued)

*Primary Examiner* — Edwin A. Leon
*Assistant Examiner* — Matthew T Dzierzynski
(74) *Attorney, Agent, or Firm* — GE Global Patent Operation; Marc A. Vivenzio

(57) ABSTRACT

An electrical penetrator assembly is shown, configured to feed electrical voltage and current through a wall separating a first volume and a second volume, which may have different pressure and/or may be filled with different fluids. The connector comprises a wall or partition having a through opening. An electrical conductor surrounded by a tubular insulator body passes the opening through the wall. A conductive or semi-conductive coating is arranged on the exterior of the insulator body, the coating surrounding the insulator body for a portion of its length, the coating in electrical contact with the wall, wherein the coated portion of the insulator body is shaped to displace the electric field (Continued)

around the conductor away from the wall and reduce the electric field strength around the insulator body by increasing the electric field strength inside the insulator body.

21 Claims, 5 Drawing Sheets

(51) Int. Cl.
 *H02G 15/14* (2006.01)
 *H02G 3/22* (2006.01)
 *H02G 15/064* (2006.01)
 *H02G 15/013* (2006.01)

(56) References Cited

U.S. PATENT DOCUMENTS

| | | | | |
|---|---|---|---|---|
| 8,708,727 | B2 * | 4/2014 | Spahi | H01R 13/523 |
| | | | | 174/152 GM |
| 9,806,456 | B2 * | 10/2017 | Lewin | H01R 13/523 |
| 2002/0074156 | A1 | 6/2002 | Forster | |
| 2013/0065429 | A1 | 3/2013 | Spahi et al. | |

FOREIGN PATENT DOCUMENTS

| | | |
|---|---|---|
| GB | 543581 A | 3/1942 |
| GB | 873356 A | 7/1961 |
| GB | 2 361 365 A | 10/2001 |
| GB | 2 434 698 A | 8/2007 |
| WO | 97/09762 A1 | 3/1997 |
| WO | 2007/096760 A1 | 8/2007 |
| WO | 2013/171070 A1 | 11/2013 |

OTHER PUBLICATIONS

International Search Report and Written Opinion issued in connection with corresponding PCT Application No. PCT/EP2015/069684 dated Dec. 3, 2015.

* cited by examiner

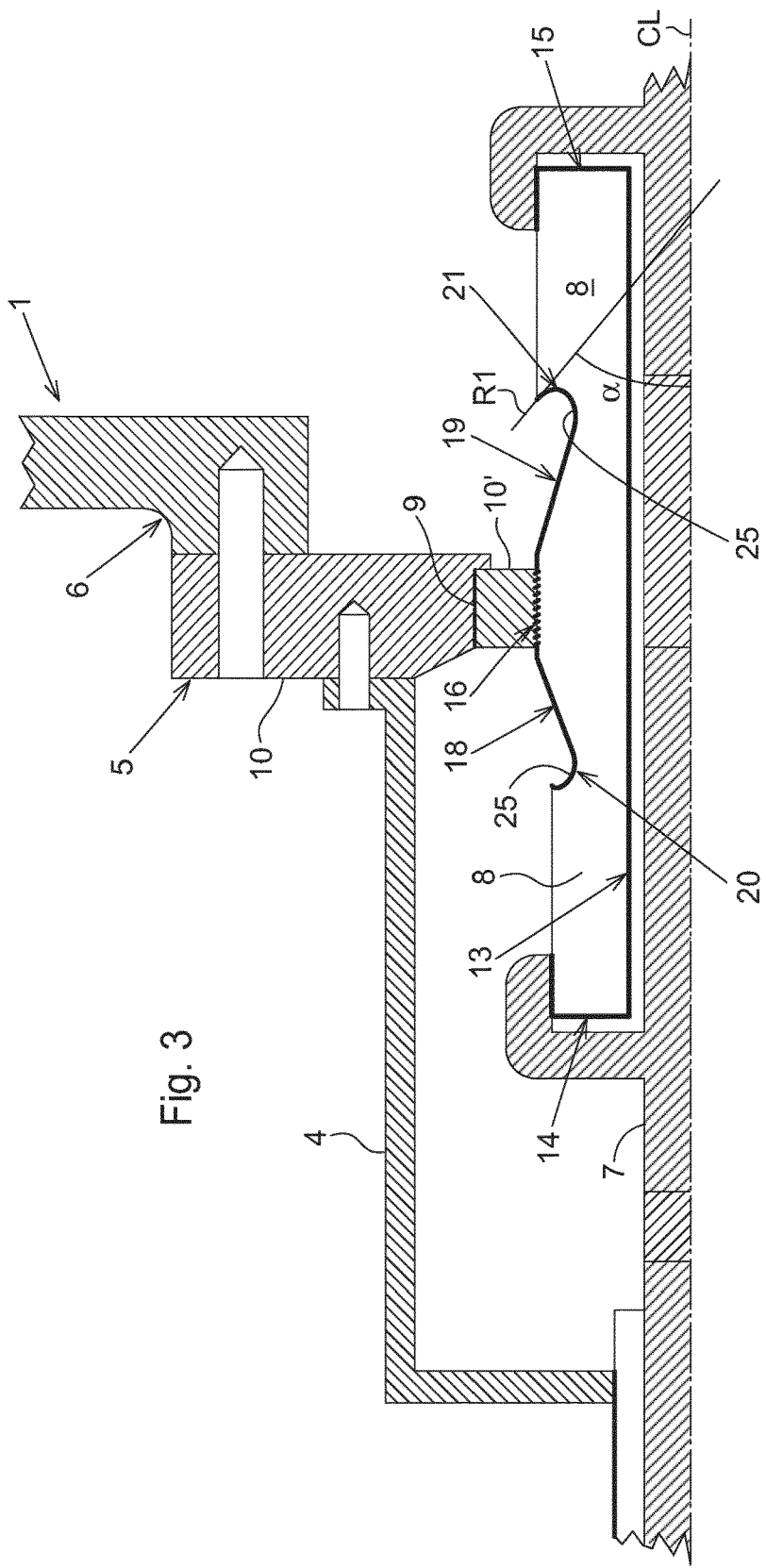

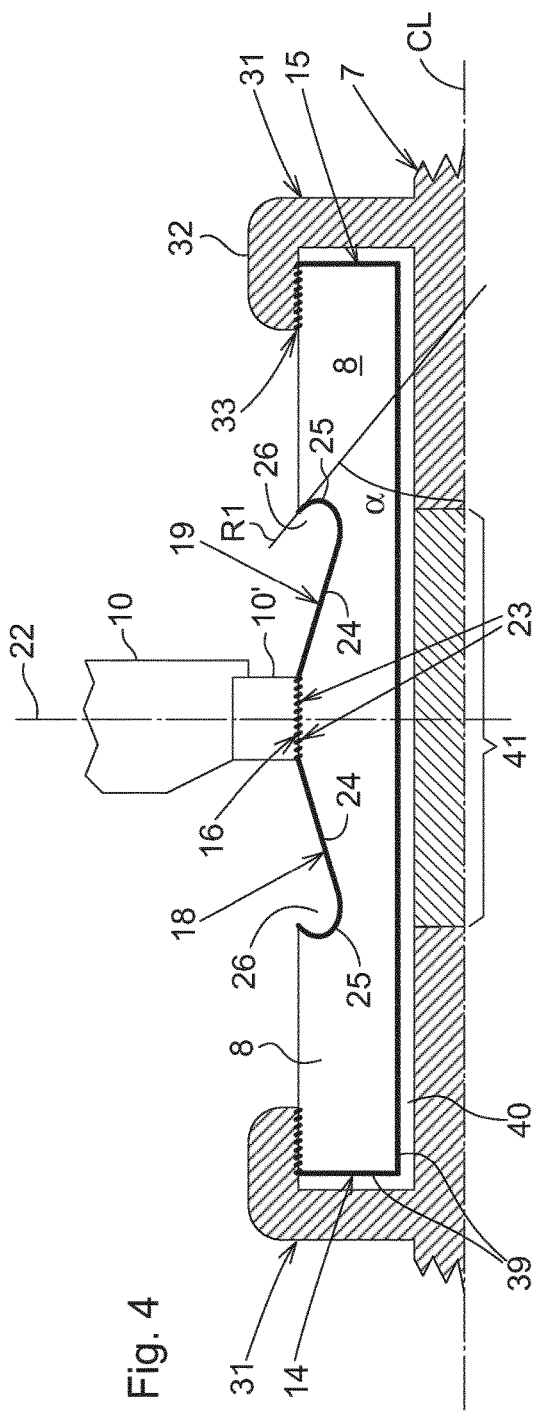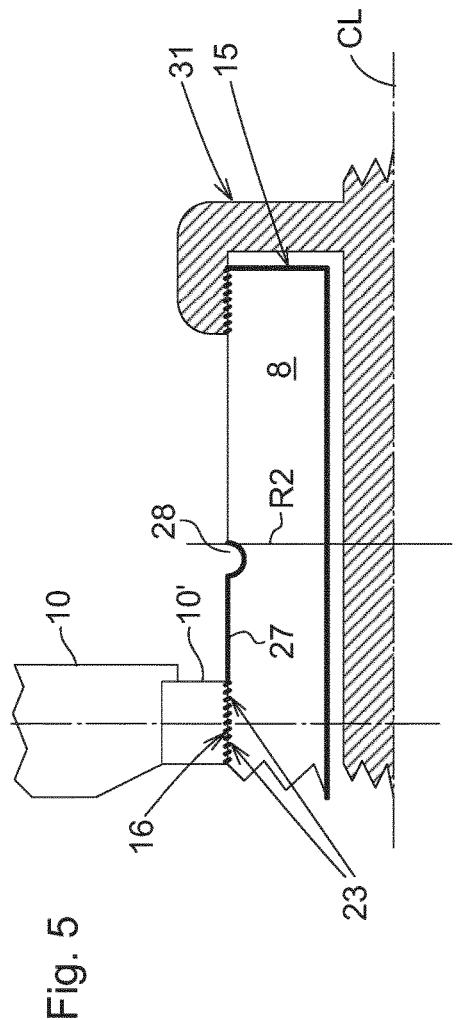

HIGH VOLTAGE PENETRATOR WITH ELECTRIC FIELD CONTROL

BACKGROUND

Embodiments of the present invention refer to electrical connectors designed to feed voltage and current to electrical equipment, such as compressor and pump motors, switchgear, subsea VSDs and transformers etc., that is typically installed inside an enclosure, the internal pressure of which is equal to or different than the pressure of the surrounding thereof. In particular, the embodiments refer to a penetrator conducting electric power through a barrier that separates volumes at equal or different pressures.

Electrical connectors are used topside and subsea to conduct electric power to electrical equipment that is installed in controlled environments to avoid the risk of electric discharge and short circuiting. The equipment referred to may be, e.g., voltage or current converters and transformers, motors, power distribution modules etc., operating at supply voltages in the order of 1,000-10,000 V or higher. For the purpose of avoiding electric discharge the electrical equipment may be installed in an enclosure which is filled with gas or liquid that provides the dielectric strength required to prevent formation of electric discharges between structures at different electric potentials. In topside applications the electrical equipment and enclosure are typically maintained at a pressure which is equal to or higher than the pressure prevailing outside the enclosure, and often at a pressure which is considerably higher than the atmospheric pressure at sea level. In subsea applications however, where the electrical equipment and enclosure may be located at depths down to 1,000 m or more, enclosures are typically maintained at a pressure which is equal to or lower than the pressure prevailing outside the enclosure. Thus, the enclosures referred to may in many cases be seen as pressure vessels where the external pressure outside the enclosure can be considerably higher than the internal pressure, or vice versa.

The task of conducting high voltage electric power to the equipment installed in the enclosure raises several problems and challenges. One of them is the task of ensuring a sealed and leak-free passage of a conductor through a wall that separates the internal space and pressure of the enclosure from the pressure of the surroundings thereof. Another challenge is to meet the need for an arrangement that prevents electric discharge between the conductor and nearby mechanical structures at other potential, usually ground potential, where the conductor passes through the wall of the enclosure. In other words, when an energized conductor is near any material at earth potential, it can cause very high electric field strengths resulting in formation of electric discharges.

To this purpose electrical penetrators have been designed for feed-through of a conductor through a wall or partition also acting as barrier between volumes at different pressures. The penetrator enables one or several conductors to pass through the wall or partition of a tank, a vessel or any form of enclosure, and insulates the conductor from the wall or partition. A means of attachment, such as a flange or other fixing device, generally forms a part of the penetrator. Another commonly used name for a penetrator is bushing.

The penetrator is a device or assembly in which a conductor is secured in a termination arrangement that is arranged protected inside a metal case. This metal case is usually an overall cylindrical housing wherein the bare conductor end is secured in an insulator body that is fixated in the housing. A rigid conductor pin is arranged protruding from the insulator body so as to pass through a wall or partition that covers and protects the conductor termination components inside the penetrator housing. The conductor pin extends electrically insulated through an opening in said wall, wherein electrical insulation is provided by means of a tubular insulator body that surrounds the conductor pin. The tubular insulator body is made to fit closely to the periphery of the opening through the wall.

A penetrator housing is typically provided if a cable or other conductor enclosed in an earthed screen is used. The housing then provides a barrier so that the inside of the housing can be filled with a dielectric fluid. Also, the housing provides earth connection between the (cable) screen and the penetrator wall.

In a forward end of the penetrator housing, if appropriate, the housing may be formed externally with a radially projecting flange that carries attachment means, such as bolt holes for bolts or similar, by which the penetrator can be mounted to the enclosure. Said flange can also be an integrated circumferential portion of the wall. A sealing ring is typically arranged to be clamped between the flange on the penetrator housing and a corresponding flange arranged on the enclosure that houses the electrical equipment.

As the penetrator assembly is mounted to the enclosure, said wall or partition acts as physical barrier between the volume of gas or liquid that occupies the internal space of the enclosure and a volume of gas or liquid that occupies the internal space of the penetrator. The internal volumes of the enclosure and penetrator can be at equal pressure, but are more usually set under different pressures. One or both volumes can be provided pressure compensation means for adjustment of internal pressure with regard to the pressure in a surrounding media, such as seawater. Since at 1,000 m below sea level, e.g., the pressure outside the penetrator and the enclosure is about 100 bar it is readily understood that the wall and the feed-through of the conductor requires proper attention in terms of design and performance.

BRIEF DESCRIPTION

An object of the present invention is to provide control of the electric field inside a high voltage electrical penetrator.

Another object of the present invention is to provide an electrical penetrator that ensures gas- and liquid-tight feed-through of electric power through the wall of an enclosure that houses electrical equipment.

Another object of the present invention is to provide an electrical penetrator that prevents or at least limits electric discharges at the feed-through of a conductor through the wall of an enclosure that houses electrical equipment.

One or more of the objects of the invention are met through a combination of insulator geometry with conductive or semi-conductive coatings as disclosed herein.

More precisely, one or more of these objects are met in an electrical penetrator assembly configured to feed voltage and current through a wall separating a first volume and a second volume, the penetrator comprising a wall or partition having a through opening, the wall being at a first potential and acting as physical barrier that separates an internal enclosure volume from an external volume at equal or different pressure, an electrical conductor at a second potential passing the opening through the wall, a tubular insulator body surrounding the conductor, and a conductive or semi-conductive coating on the exterior of the insulator body, the coating surrounding the insulator body for a portion of its length, the coating in electrical contact with the wall, wherein the coated portion of the insulator body is formed to displace the electric field around the conductor away from the wall and reduce the electric field strength around the insulator body by increasing the electric field strength inside the insulator body.

The wall may in this context be seen as a partition that separates the first and second volumes which may be at equal or at different pressures. The wall referred to may be a structural member of the penetrator, in which case the wall can be an integrated part of the penetrator or a separate part that is connectable to the penetrator. In certain embodiments the wall provides a gas- and liquid-tight barrier between the internal volume of a penetrator housing and the internal volume of an enclosure that houses the electrical equipment to be supplied. The wall may optionally include a mounting flange by which the penetrator can be secured to the enclosure.

In another embodiment the coated geometry comprises a straight cylinder portion extending towards an end of the insulator body, the cylinder portion terminating in a circumferential groove that opens substantially in radial direction in the periphery of the insulator body.

In one embodiment, the said groove is arranged to open at an angle that is inclined towards the wall, the inclination from a perpendicular to the longitudinal center axis amounting to 0-45°.

In other embodiments the coated geometry comprises a portion extending towards an end of the insulator body, the coated portion terminating in a solid conductive or semi-conductive toroidal body running countersunk in the periphery of the insulator body.

In the embodiments shown the coated geometry on a rear portion of the insulator body may be the identical or almost identical mirror image of the coated geometry on a forward portion of the insulator body, the rear and forward portions referred to being the portions of the insulator body which are separated by the wall in mounted position.

The recited geometries may also and alternatively be combined such that the coated geometry on the rear portion is different from the coated geometry on the forward portion of the insulator body.

However, from the following disclosure it will be understood that a common feature for the embodiments shown is that the coated geometry ends in a radius that cuts concavely into the periphery of the insulator body.

The insulator body may be joined to the conductor in a molding or press molding production technique wherein the insulator body is formed directly about the conductor.

Alternatively, the insulator body is finished separately from the conductor and joined to the conductor in a later process.

Assembly of the separately finished insulator body and the conductor can be accomplished through any of a welding, brazing, soldering, crimping or gluing bonding process by which the insulator body and the conductor are mechanically interconnected, directly or indirectly.

The assembly of insulator body and conductor can be achieved by connecting the two at coupling points which are restrictedly located to the two end regions of the insulator body and the conductor. In other words, the insulator body and the conductor can be interconnected mechanically and sealed at both ends of the insulator body through any suitable bonding process such as welding, brazing, soldering, gluing or crimping.

In the assembled state the insulator body surrounds the conductor while forming an annular gap about the conductor when the two are joined together. After completed assembly the gap constitutes a closed volume that holds atmospheric pressure or a pressure lower than the pressure on either side of the wall.

Assembly of the separately finished insulator body and the conductor can alternatively be accomplished by mechanically interconnecting and sealing the two at both ends of the insulator body through a sealed bolted connection.

In order to avoid electric discharges in the above mentioned gap a semi-conductive or conductive coating may be applied to the inner surface of the insulator body, i.e. between the conductor and the insulator body.

In the separately finished insulator body the semi-conductive or conductive coating is applied to the inner surface of the tubular body, the coating thus facing the conductor. The gap mentioned above is thus formed between the metalized inner surface of the tubular insulator body and the outer surface of the conductor.

The conductor may be connected to an end of the insulator body via an interconnecting adapter element adapted for bonding to both a ceramic and to a metal. This adapter element can be made of a low expansion metal or metal alloy, suitable for ceramic-to-metal bonding applications. Examples of suitable material are titanium or nickel-iron alloy, e.g.

It is further foreseen that an additional adapter element, made of a low expansion metal or metal alloy that is suitable for both welding and brazing, can be inter-positioned between the adapter element and the conductor. In order to separate the adapter elements in this disclosure, the latter will be named "weld" adapter element.

In order to compensate for different thermal expansion in the insulator body and conductor materials, the length of the conductor may be composed of two or more conductor lengths which are joined in a flexible connection, such as an axially sliding connection.

It is further foreseen that an adapter ring is bonded to the external contact surface of the insulator body through any suitable bonding process such as brazing, soldering, gluing or crimping.

The adapter ring may be arranged for bolting or welding to the wall of the penetrator assembly.

The adapter ring and the wall may alternatively be interconnected mechanically and sealed using a metal seal and a bolted connection.

In one embodiment of the electrical penetrator, a rear end of the conductor is connected to a cable termination device that is carried in a pressurized and/or pressure compensated penetrator housing, whereas a forward end of the conductor projects through a wall that seals the penetrator housing in a forward end of the penetrator.

Further details and aspects of the present invention will be discussed below in the detailed description.

BRIEF DESCRIPTION OF THE DRAWINGS

Embodiments of the invention will be further explained below with reference made to the accompanying drawings. In the drawings, FIG. 3 is a longitudinal section through a portion of the penetrator comprising a tubular insulator body designed to electrically separate a conductor from nearby structures of different potential in the electrical penetrator, FIG. 4 is a schematic, longitudinal section showing the feed-through of a conductor through the wall of a penetrator, and a geometry in a coated surface of the insulator body, FIG. 5 is a view showing an alternative geometry in the surface of the insulator body and coating.

DETAILED DESCRIPTION

Figure 1:
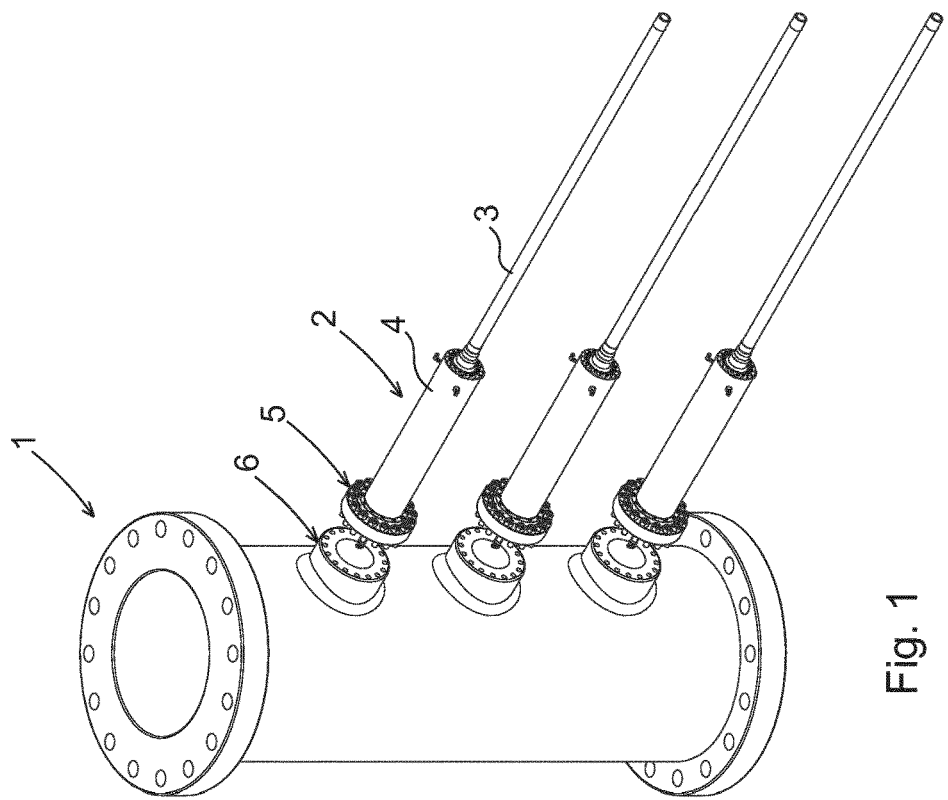
FIG. 1 shows three connector assemblies each including an electrical penetrator in a perspective view, about to connect with electrical equipment installed in an enclosure.

In FIG. 1 reference number 1 denotes one example of the type of enclosures for electrical equipment which is of interest in connection with embodiments of the present invention. The enclosure 1 may serve as protective housing for a motor, a pump or compressor or other electrical equipment that operates on voltage and current to be supplied via an electrical penetrator assembly 2. The penetrator assembly or penetrator 2 is a cable termination assembly wherein a conductor of single phase cable 3 is ended inside a penetrator housing 4. The cable termination components in the penetrator housing are known to a skilled person and need not be fully explained in this connection in order to understand or practice embodiments of the invention.

A forward end of the penetrator housing carries a coupling interface in the form of a flange 5 that carries means for coupling the penetrator to one of a group of seats 6 which are formed on the enclosure 1 to mate with the penetrator. Three seats 6 may be arranged on the enclosure 1 for supply of three-phase HVAC to the equipment inside the enclosure 1.

It should however be realized that embodiments of the present invention are not limited to the penetrator design illustrated and disclosed with reference to FIG. 1, which is only one example of a penetrator in which the present embodiments can be implemented.

Figure 2:
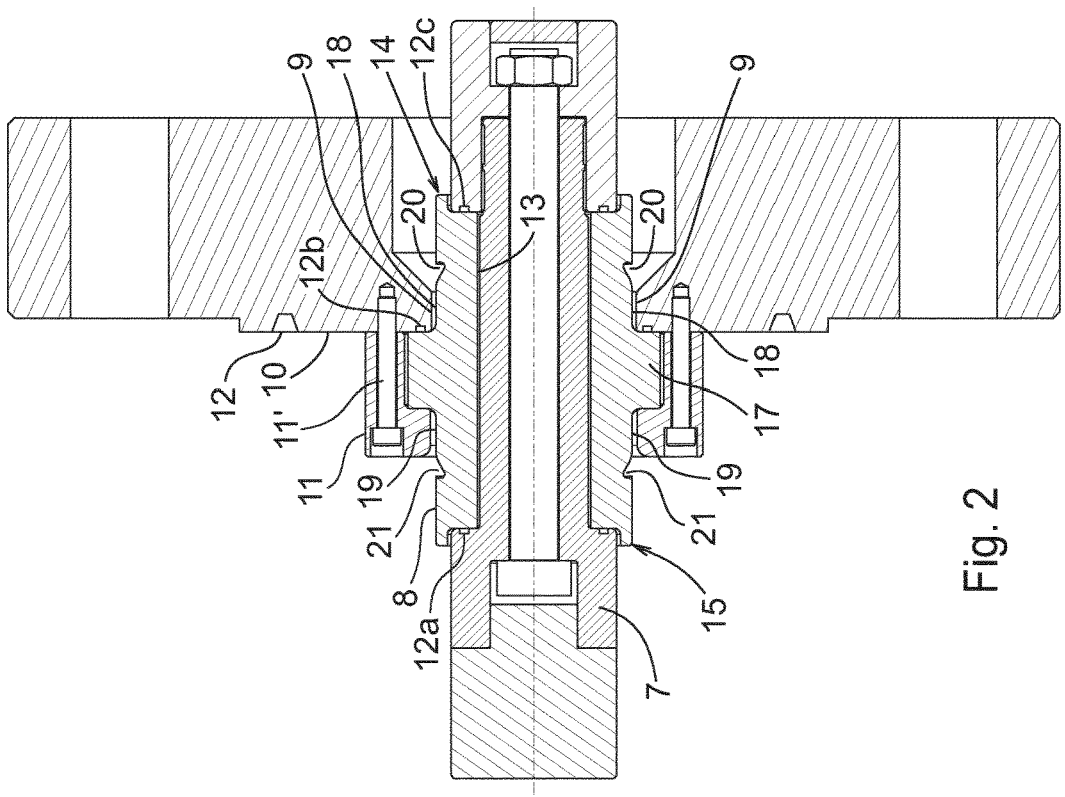
FIG. 2 is a broken away forward detail on larger scale of an electrical penetrator.

FIG. 2 shows a cut out portion of the forward end of a penetrator assembly, such as the penetrator 2 of FIG. 1, e.g.

A conductor pin 7 projects in the forward end of the penetrator to mate with a conductor that extends in opposite direction from its mount in the enclosure. The conductor pin 7 is surrounded by an insulator body 8 which provides distance and electrical insulation to nearby structures at other potential, typically at ground potential, in the penetrator assembly. More precisely, the insulator body 8 provides electrically insulated feed-through of the conductor pin 7 through an opening 9 in a wall or partition 10 that closes the interior of the penetrator housing 4 in the forward end of the penetrator. In this context, the forward end of the penetrator is that end which faces the electrical equipment to be supplied electric power via the penetrator.

In the connected position at which the penetrator is coupled to the enclosure, the wall 10 acts as a physical barrier that separates the inside volume of the enclosure 1 from the inside volume of the penetrator 2. These volumes can be at equal pressure but are more often maintained at different pressures in the dielectric media that fills the volumes to suppress/avoid electric discharge between structures at different potential.

To prevent dielectric media and pressure from leaking between the two volumes, the insulator body and conductor pin can be fixed in place by means of a mounting ring or adapter element 10' that fits about the cylinder surface of the insulator body.

In the embodiment illustrated in FIG. 2 the mounting flange 5 is an integrated and peripheral part of the wall 10. The flange 5 carries in its face an annular groove 12 for accommodation of a sealing ring (not shown). Additional seals 12a, 12b and 12c are applied appropriately to provide gas- and liquid-tight interfaces which act as physical barriers that separate the volumes on each side of the respective wall. The seals may be realized as metal seals, polymer seals in the form O-rings, e.g.

FIG. 3 shows another view of the embodiment of the insulator body 8. The insulator body 8 of FIG. 3 is a tubular, rotationally symmetric element comprising an inner periphery and surface 13 that defines a passage for a conductor pin 7 to be inserted so as to pass through the insulator body. More precisely, the conductor pin 7 passes through the insulator body 8 between an inner or rear end 14 and an outer or forward end 15 of the insulator body, the conductor pin reaching beyond the ends 14 and 15 of the insulator body.

A contact surface 16 is formed on a cylindrical portion in the outer periphery or surface of the insulator body. The contact surface 16 has a circumferential length and diameter that is adapted for a close fit with the periphery and diameter of the opening through the wall 10. The contact surface 16 may alternatively be adapted to mate with the periphery and diameter of a corresponding opening through the adapter element 10', if appropriate. With reference to FIG. 2, a contact surface 16 may be formed on a radially protruding length or shoulder 17 that rises above the surface of the insulator body on each side of the shoulder.

The contact surface 16 may or may not carry a conductive or semi-conductive or metal coating as further discussed below. In either case, the contact surface 16 is adapted for fixation of the insulator body and conductor in the opening through the wall, or in the opening through an adapter ring if appropriate, by means of a suitable bonding process such as brazing, soldering crimping or gluing. The contact surface 16 may be formed on a metallized portion of the exterior of the insulator body 8.

The insulator body 8 is provided a special geometry in its outer periphery. This geometry is particularly conceived and designed to modify the shape and intensity of the electric field which is generated about the conductor pin as current is fed through the conductor pin at high voltage. The special geometry comprises lengths/surfaces 18 and 19 which are coated with conductive or semi-conductive material that is applied on the exterior of the insulator body, or which is buried into the surface of the insulator body, so as to extend towards the inner/rear end 14 and/or the outer/forward end 15. The conductive or semi-conductive coated lengths or surfaces 18 and 19 are terminated through radii 20 and 21 which are countersunk into the body of insulator 8, in the form of concave recesses.

FIG. 4 shows one embodiment of the coated outer geometry of the insulator body 8. In this embodiment the coated length of the insulator body comprises identical geometries applied on the rear and forward sides of a symmetry plane 22.

The symmetry plane 22 may be located in the wall, in that case intersecting the contact surface 16 as illustrated in FIG. 4. In other embodiments the geometry may be symmetrically applied with respect to a symmetry plane located outside the wall or outside the contact surface 16.

Thus on each side of the symmetry plane 22, the coated geometry comprises a coated portion 23. The coated portion 23 may include the contact surface 16, but need not be identical in length and may thus extend further towards one or both ends of the insulator body.

Adjoining the coated portion 23, a coated conical portion 24 converges towards the end 14 and/or 15 of the insulator body. In its narrow end the conical portion 24 transforms into a concave recess or groove 25 that runs about the outer surface of the insulator body 8, and which opens mainly in a radial direction. More precisely, the mouth 26 of the groove may be facing in a radial direction R1 that is oriented at an angle α relative to a longitudinal center axis CL of the penetrator such that the mouth 26 is turned towards the symmetry plane 22, and thus in mounted position obliquely oriented towards the wall 10. The groove 25 may be arranged to open at an angle α that is inclined towards the wall 10 wherein the inclination α amounts to approximately 45-90° relative to the longitudinal center axis CL of the penetrator, or in other words an inclination α that is substantially 45° or more than 45° or substantially 90° or less than 90° relative to the center axis CL. Thus, as used herein, the expression "mainly radial" refers to an orientation that is located within that angular interval.

FIG. 5 shows another embodiment of the coated outer geometry of the insulator body 8. In the embodiment of FIG. 5 the coated geometry comprises a coated cylindrical portion 27. The coated cylindrical portion 27 may be an extended length 27 of the coated cylindrical portion 23, which optionally includes the contact surface 16. The coated cylindrical length 27 is terminated in a circumferential, concave recess or groove 28 that opens substantially in radial direction in the periphery of the insulator body. More precisely, the groove 28 may be oriented to open in a radial direction R2 which is substantially perpendicular to the center axis CL as illustrated in FIG. 5. As used herein, the expression "substantially perpendicular" refers to an orientation that may be inclined towards the wall 10, wherein the inclination from the perpendicular may amount to approximately 0-45°, or in other words an inclination that is substantially 0° or more than 0° or substantially 45° or less than 45° relative to the perpendicular. Thus, as used herein the expression "substantially radial" refers to an orientation that is located within that angular interval. The groove 28 may be formed to have a semi-circular cross section.

All references made to the orientation of the mouth to the groove 25 and 28 respectively shall be contemplated with respect to a line that intersects the center axis CL at an inclination that coincides with the position and orientation of the periphery of the groove at the mouth, as illustrated in FIGS. 3, 4 and 5.

Figure 6:
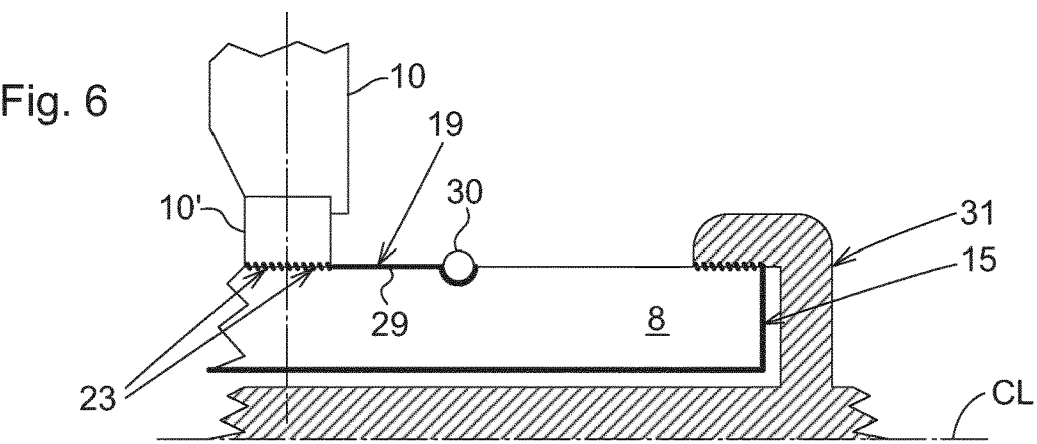
FIG. 6 is another view showing yet an alternative geometry in the surface of the insulator body and coating.

Yet another embodiment of the coated outer geometry is shown in FIG. 6. In the embodiment of FIG. 6 the coated geometry comprises a coated portion 29. The coated portion 29 may be an extended length 29 of the coated cylindrical portion 23 which optionally includes the contact surface 16. The coated length 29 is terminated in a solid toroidal body 30 of conductive or semi-conductive material that runs countersunk in the outer surface and periphery of the insulator body. The countersunk portion of the toroidal body 30 forms a recessed concave radius in the end of the coated geometry.

Any of the embodiments discussed above may include separately manufactured insulator bodies and conductor pins arranged to be assembled in a successive finishing process. To this purpose, the conductor pin 7 may be arranged with a mounting means 31 by which the conductor pin can be mechanically coupled to the insulator body. The mounting means can have the shape of a sleeve 31 that is carried in concentric relation about the conductor pin 7, attached to the conductor pin via a radial extension from the surface of the conductor pin.

In the embodiment depicted in FIG. 4 the sleeve 31 comprises a length 32 that extends over the insulator body in a concentric and overlapping relation. The insulator body may be bonded to the overlapping length of the sleeve 31 by soldering, brazing or gluing at the interface 33 between the insulator body and the sleeve 31.

Figure 7:
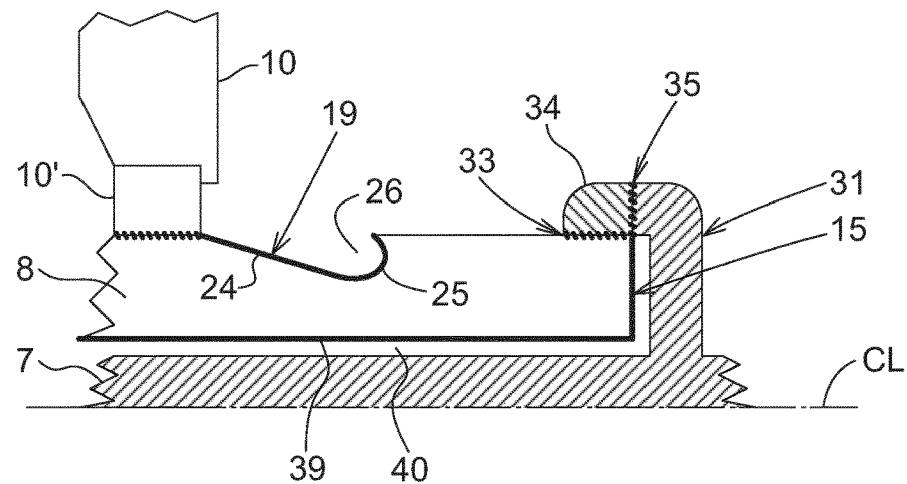
FIG. 7 is a cut out right hand portion of FIG. 4 showing an alternative connection between a conductor and its surrounding insulator body.

In the embodiment of FIG. 7 the overlapping length of the sleeve 31 comprises a separate adapter element 34 which extends over the insulator body in an overlapping relation. The adapter element 34 may be bonded to the sleeve 31 by soldering, brazing or welding at the interface 35 between the adapter element 34 and the sleeve 31. The insulator body may be bonded to the overlapping adapter element 34 by soldering, brazing or gluing at the interface 33 between the insulator body and the adapter element 34. In particular, the element 34 may be adapted for bonding to both of a ceramic insulator body and to a metal conductor.

Figure 8:
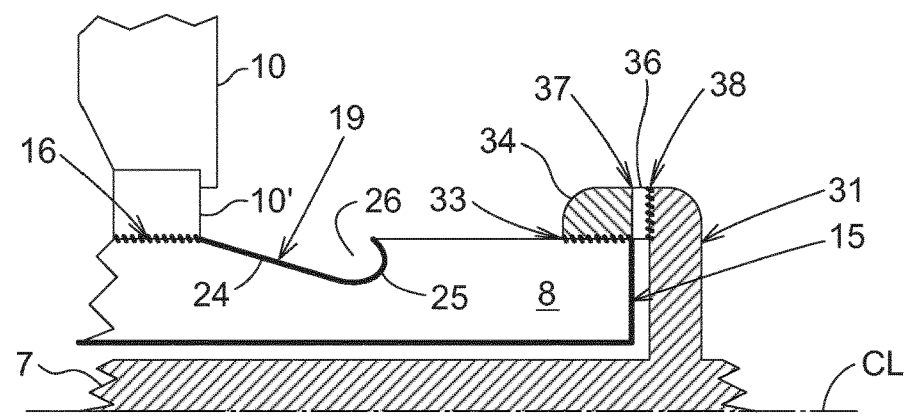
FIG. 8 is a view similar to FIG. 7 showing another alternative connection between conductor and insulator body.

In the embodiment of FIG. 8 the overlapping length of the sleeve 31 comprises an additional adapter element 36 that is inter-positioned between the adapter element 34 and the sleeve 31. The additional adapter element 36 can be seen as a weld adapter element suitable for bonding to the adapter element 34 and the sleeve 31 by soldering, brazing or welding at the interfaces 37 and 38. As in previous embodiments, the insulator body may be bonded to the overlapping adapter element 34 by soldering, brazing or gluing at the interface 33 between the insulator body and the adapter element 34. The adapter element 34 and the weld adapter element 36 may both include a low expansion metal or metal alloy such as titanium or a nickel-iron alloy, e.g.

Figure 9:
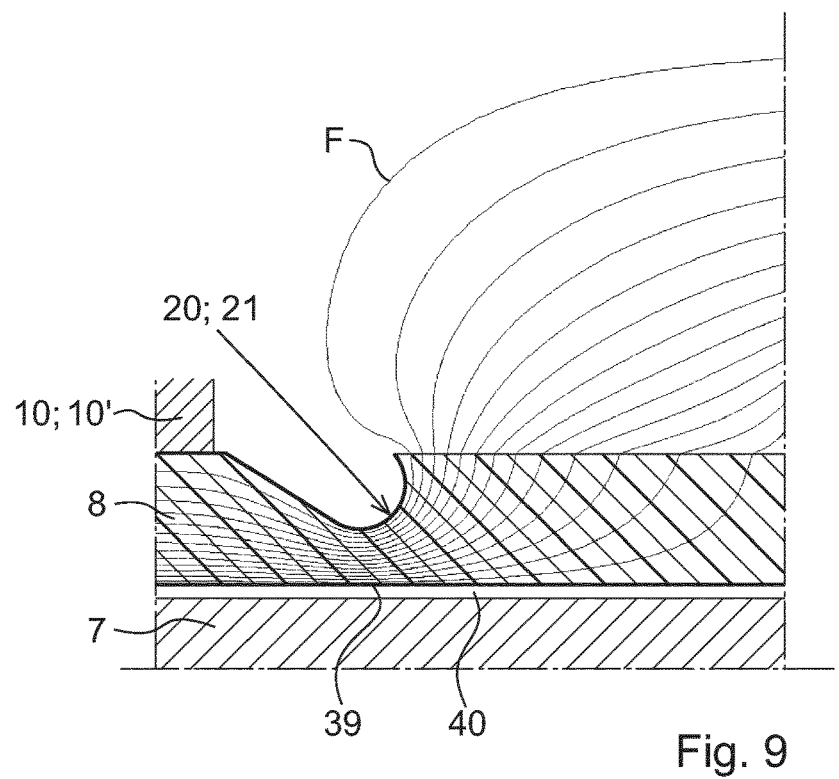
FIG. 9 is a cutout portion of the electrical penetrator illustrating the electric field (equipotential plot) that surrounds the conductor in one embodiment of the electrical penetrator.
Figure 10:
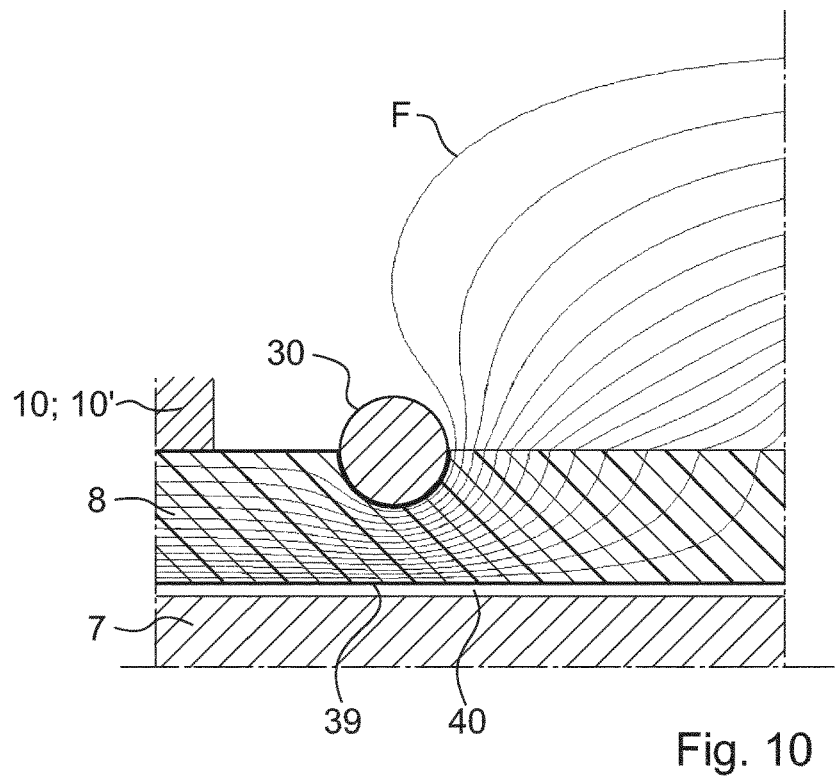
FIG. 10 shows the (equipotential plot) of the electric field that surrounds the conductor in another embodiment of the electrical penetrator.

In the above embodiments the shape and extension of the coated geometry is designed to focus the electric field within the insulator body for the coated length thereof, as illustrated in FIGS. 9 and 10. A feature which is common for the embodiments are the countersunk radii 20 and 21, or the countersunk circumference of the body 30, which terminates the coated lengths/surfaces of the insulator body 8. The rounded geometries affect also the boundaries of the electric field F as it leaves the insulator body outside the coated areas. The coating and geometry in combination, when applied in consideration of the surrounding wall structure, controls the electric field such that a distance sufficient to prevent formation of electric discharges is created/established from the wall 10, 10'. In other words the coated geometry focuses and displaces the electric field towards the ends of the insulator body, away from the wall when the insulator body is mounted in the penetrator.

In result of using the adapter element 34, the additional adapter element 36 and the conductor of different materials, the process of assembling can be optimized by proper choice of bonding process at the interfaces between the insulator body, the adapter element(s), and the conductor. For example, the additional weld adapter element 36 can be brazed to the conductor 7 and welded to the adapter element 34, which in turn can be brazed to the insulator body 8. This way, the whole conductor needs not be involved in welding or brazing, e.g.

In order to avoid formation of electric discharges between the conductor 7 and the insulator body 8, the electric field may be further controlled within the insulator body when the latter is formed with a metal coating 39 on its inner surface that faces the conductor in assembled state. The metalized inner surface will have the same electric potential as the conductor, avoiding electric field in the annular gap 40 that is formed between the insulator body and the conductor upon assembly. The annular gap 40 will be hermetically sealed at atmospheric pressure typically at about 1 bar when the conductor and the insulator body are assembled.

In embodiments where the conductor 7 attaches to both ends 14, 15 of the insulator body 8, different thermal properties between the conductor material and the insulator material may require a flexible joint between the parts of a two-piece conductor in order to compensate for differences in thermal expansion. For example, a flexible joint may be located in a central region of the conductor as illustrated by reference number 41 in FIG. 4. The flexible joint may be realized as a sliding connection, such as a telescopic coupling.

Conclusively, in certain embodiments the novel design of a ceramic barrier will allow for the development of highly reliable, high differential pressure barriers for equipment such as compressors, pumps, and switchgear.

Embodiments of the invention utilize an optimized geometry in combination with the strength of a ceramic material to enable high voltage (>3 kV) electrical performance in accordance with the stringent requirements to electrical penetrators, both for topside and subsea applications. The effect is enabled by two main factors: the geometry and shape of the metallized area on the outer surface of the insulator body is designed such that the electrical fields are led in the direction of the insulator body; and metallizing a ceramic material with a conductive material in the sensitive interface between the live conductor and the insulator body, and between the insulator body and the grounded housing. The metallization generates a void free bonding between the conductive coating and the insulator material.

Among the potential benefits which are provided by embodiments of the present invention are, e.g., i) a chemically inert and gas tight interface, ii) high differential pressure capability, iii) operation towards hydrocarbon environment, and iv): excellent electric properties.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. An electrical penetrator assembly configured to feed electrical voltage and current through a wall separating a first volume and a second volume, the electrical penetrator assembly comprising:
   a wall or partition having a through opening, the wall being at a first potential and acting as a physical barrier that separates the first volume from the second volume at equal or different pressure;
   an electrical conductor at a second potential passing the opening through the wall;
   a tubular insulator body surrounding the conductor; and
   a conductive or semi-conductive coating on the exterior of the insulator body, the coating surrounding the insulator body for a portion of its length, and the coating in electrical contact with the wall, wherein the coated portion of the insulator body is shaped to displace the electric field around the conductor away from the wall and reduce the electric field strength around the insulator body by increasing the electric field strength inside the insulator body,
   wherein the coating comprises a conical portion converging towards an end of the insulator body, the conical portion in the narrow end which faces the end of the insulator body being transformed into a circumferential groove that opens mainly in radial direction.

2. The electrical penetrator assembly of claim 1, wherein the coating is applied to the exterior of a rotationally symmetric portion of the insulator body, the geometry of which is designed to confine the electrical field within the insulator body for the coated length thereof.

3. The electrical penetrator assembly of claim 2, wherein the coated geometry ends in a curved surface that cuts concavely into the periphery of the tubular insulator body.

4. The electrical penetrator assembly of claim 1, wherein the groove is arranged to open at an angle that is inclined towards the wall, the inclination amounting to 45-90° relative to a longitudinal center axis of the penetrator.

5. The electrical penetrator assembly of claim 1, wherein the tubular insulator body is a ceramic body and the coating is a metal coating.

6. The electrical penetrator assembly of claim 1, wherein the inner surface of the tubular insulator body carries an electrically conductive or semi-conductive coating facing the conductor.

7. The electrical penetrator assembly of claim 6, wherein a gap is formed between the metalized inner surface of the insulator body and the outer surface of the electrical conductor.

8. The electrical penetrator assembly of claim 7, wherein the gap is a closed volume holding atmospheric pressure, or a pressure lower than the pressure on either side of the wall.

9. The electrical penetrator assembly of claim 1, wherein the tubular insulator body and the electrical conductor are directly or indirectly interconnected mechanically and sealed at both ends of the tubular insulator body through any of welding, brazing, soldering, gluing or crimping.

10. The electrical penetrator assembly of claim 1, wherein the tubular insulator body and the electrical conductor are interconnected mechanically and sealed at both ends of the tubular insulator body through a sealed bolted connection.

11. The electrical penetrator assembly of claim 1, wherein the electrical conductor is composed of two conductor lengths which are joined in a flexible connection.

12. The electrical penetrator assembly of claim 1, wherein an adapter ring is bonded to an external contact surface on a ceramic insulator body through any of brazing, soldering, gluing or crimping.

13. The electrical penetrator of claim 12, wherein the adapter ring is welded to the wall.

14. The electrical penetrator assembly of claim 12, wherein the adapter ring and the wall are interconnected mechanically and sealed using a metal seal and a bolted connection.

15. The electrical penetrator assembly of claim 1, wherein a rear end of the electrical conductor is connected to a cable termination device carried in a pressurized and/or pressure compensated penetrator housing, whereas a forward end of the electrical conductor projects through a wall that seals the penetrator housing in a forward end of the penetrator.

16. An electrical penetrator assembly configured to feed electrical voltage and current through a wall separating a first volume and a second volume, the electrical penetrator assembly comprising:
- a wall or partition having a through opening, the wall being at a first potential and acting as a physical barrier that separates the first volume from the second volume at equal or different pressure;
- an electrical conductor at a second potential passing the opening through the wall;
- a tubular insulator body surrounding the conductor; and
- a conductive or semi-conductive coating on the exterior of the insulator body, the coating surrounding the insulator body for a portion of its length, and the coating in electrical contact with the wall, wherein the coated portion of the insulator body is shaped to displace the electric field around the conductor away from the wall and reduce the electric field strength around the insulator body by increasing the electric field strength inside the insulator body,
- wherein the coating comprises a straight cylinder portion extending towards an end of the tubular insulator body, the cylinder portion terminating in a circumferential groove that opens substantially in radial direction in the periphery of the tubular insulator body.

17. The electrical penetrator assembly of claim 16, wherein the groove is arranged to open at an angle that is inclined towards the wall, the inclination from a perpendicular to the longitudinal center axis amounting to 0-45°.

18. An electrical penetrator assembly configured to feed electrical voltage and current through a wall separating a first volume and a second volume, the electrical penetrator assembly comprising:
- a wall or partition having a through opening, the wall being at a first potential and acting as a physical barrier that separates the first volume from the second volume at equal or different pressure;
- an electrical conductor at a second potential passing the opening through the wall;
- a tubular insulator body surrounding the conductor; and
- a conductive or semi-conductive coating on the exterior of the insulator body, the coating surrounding the insulator body for a portion of its length, and the coating in electrical contact with the wall, wherein the coated portion of the insulator body is shaped to displace the electric field around the conductor away from the wall and reduce the electric field strength around the insulator body by increasing the electric field strength inside the insulator body,
- wherein the conductor is connected to an end of the insulator body via an adapter element and a weld adapter element of a low expansion metal or metal alloy suitable for welding and brazing, is inter-positioned between the adapter element and the conductor.

19. The electrical penetrator assembly of claim 18, wherein the coating comprises a portion extending towards an end of the tubular insulator body, the coated portion terminating in a solid conductive or semi-conductive toroidal body running countersunk in the periphery of the tubular insulator body.

20. The electrical penetrator assembly of claim 18, wherein the adapter element is adapted for bonding to both of a ceramic material and to metal.

21. The electrical penetrator assembly of claim 18, wherein the adapter element is made of a low expansion metal or metal alloy, suitable for ceramic-to-metal bonding applications.

* * * * *